Patented June 24, 1924.

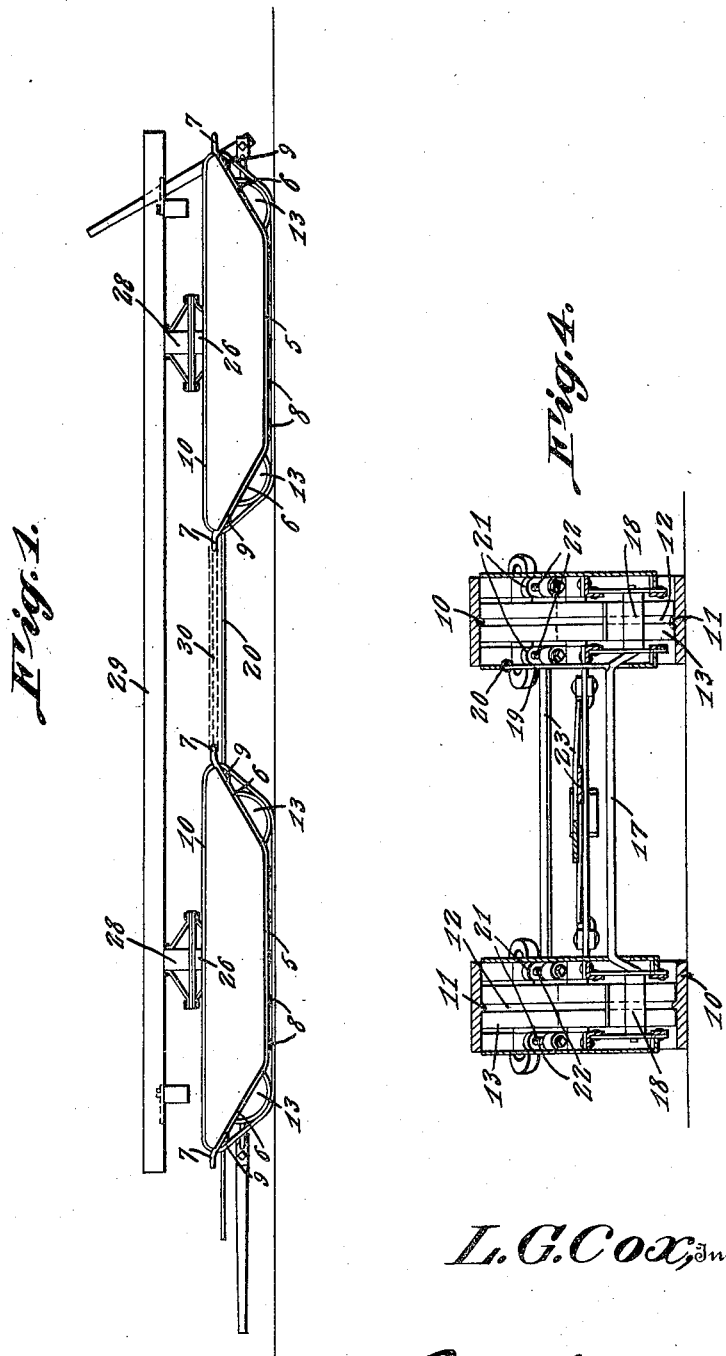

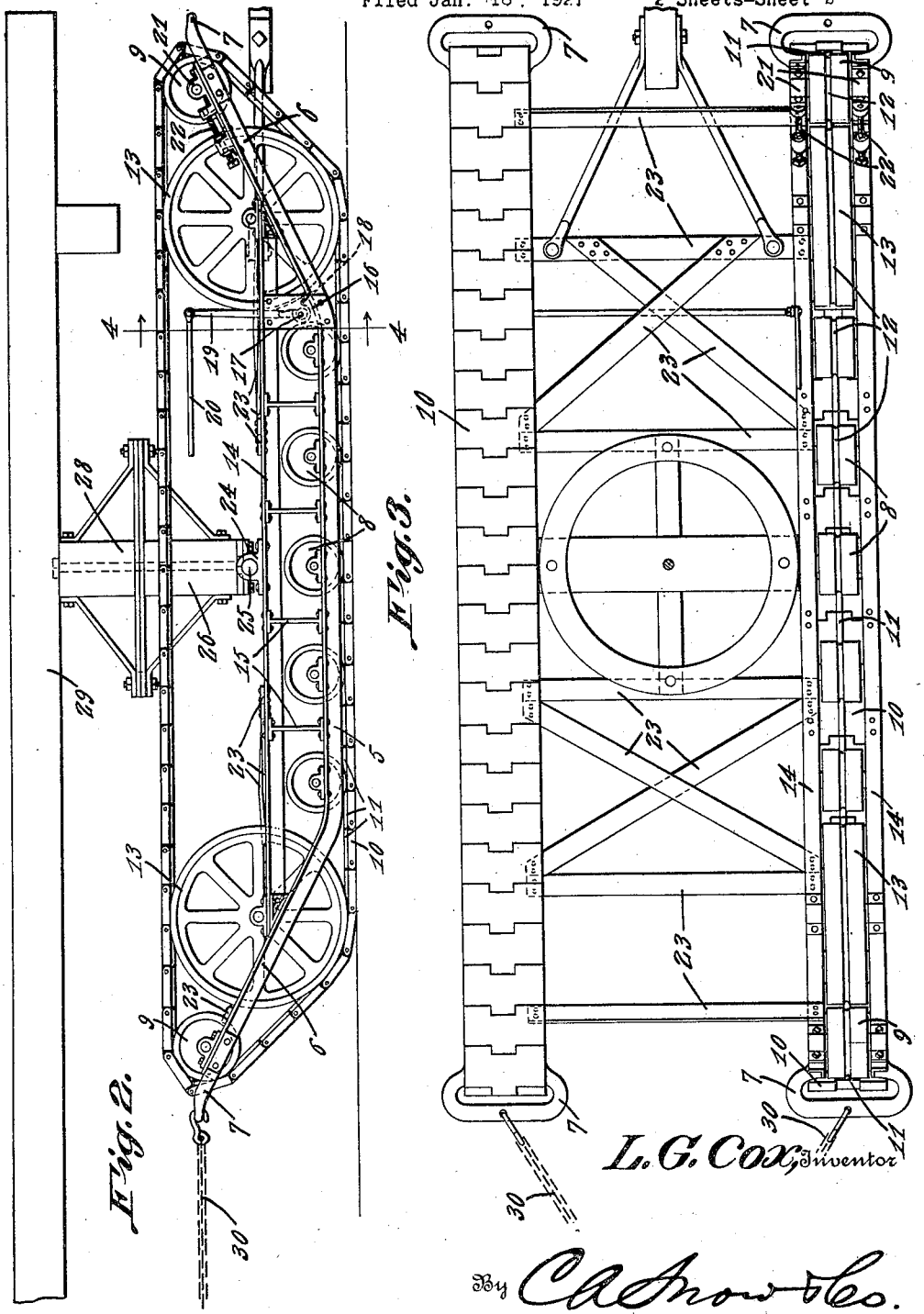

1,498,786

UNITED STATES PATENT OFFICE.

LINCOLN G. COX, OF LUBEC, MAINE, ASSIGNOR OF ONE-HALF TO CHARLES R. LEIGHTON, OF LUBEC, MAINE.

TRAILER.

Application filed January 18, 1921. Serial No. 438,230.

*To all whom it may concern:*

Be it known that I, LINCOLN G. Cox, a citizen of the United States, residing at Lubec, in the county of Washington and State of Maine, have invented a new and useful Trailer, of which the following is a specification.

This invention has reference to trailers, and more particularly to a novel form of trailer designed for use in connection with tractors or the like.

The primary object of the invention is to provide a trailer of this character which may be efficiently used in summer or winter, the same being of a construction to meet various road conditions.

A further object of the invention is to provide a trailer including a pair of trucks, there being provided novel means for connecting the trucks, whereby one truck will move simultaneously with the other to insure a true trailing of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a trailer constructed in accordance with the present invention.

Figure 2 is a side elevational view of one of the trucks, one of the side plates thereof being removed.

Figure 3 is a plan view of one of the trucks.

Figure 4 is a sectional view taken on line 4—4 of Figure 2.

Referring to the drawings in detail, the reference character 5 designates one of the side rails of one of the side sections of a truck forming a part of the trailer, it being understood that two of such trucks are provided to support the body of the trailer.

The side rails are arranged in pairs, and have a central portion which is relatively straight, and operates in parallel relation with the surface on which the truck is supported, the ends of the side members 5 extending upwardly at angles, as indicated at 6, where the extreme outer ends are formed with eyes, which eyes afford means for connecting the adjacent ends of trucks.

Between the side rails 5 of each side section of the respective trucks, are positioned a plurality of rollers 8, which are disposed in spaced relation with each other throughout the length of the side section, there being provided a roller 9 disposed adjacent to each end of the side sections, over which the creeper 10 operates, the creeper being composed of a plurality of pivotally connected links, each of which being provided with a rib 11. Each of these rollers is mounted in a suitable bearing which has connection with the upper surfaces of the rails 5, and as shown, each of these rollers is provided with a peripheral groove 12 designed to accommodate the ribs 11 of the creeper 10, thereby insuring against lateral movement of the creeper on the rollers, when the trailer is moving sideways, or making a turn.

Supported by the upwardly extending portions 6 of the side rails 5 are the relatively large wheels 13 which are of diameters to engage the sections of the creeper which are contacting with the ground surface, and also the section of the creeper which is moving along the upper edge of the truck, thus supporting the creeper and preventing sagging thereof.

The relatively large wheels 13 are also provided with peripheral grooves to accommodate the ribs 11. Each side section of a truck, also includes a pair of rails 14 which have their ends connected to the inclined portion 6 of the side rails 5, the intermediate portion of the rails 14 being held in spaced relation with the rails 5 as by means of the spacing bars 15.

Connecting the rails 5 and 14 is a brake shoe support 16 which is provided with a suitable bearing to receive the shaft 17, on which operates the brake shoe 18, the arm 19 having connection with the brake shoe 18 so that movement of the arm 19, will result in applying or releasing the brake shoe 18.

An operating rod 20 has connection with the arm 19 and extends forward where the same has connection with the tractor not shown, and which is used in connection with the trailer, so that the brakes may be applied from a position in close proximity to the operator.

The bearings 21 which support the rollers 9 that are disposed at the rear of the respective side sections of a truck, are provided with suitable guideways to permit the rollers to be adjusted along the inclined portions of the rails 5, as by means of the set screws 22 so that the slack in the creeper may be compensated for.

As before stated each truck includes a pair of side sections and the side sections are connected as by means of the transversely extending bars 23, there being provided bearings 24 on the respective sections to accommodate the shaft 25, which in turn has connection with the bolster 26 which supports the lower portion of the fifth wheel, the upper portion 28 thereof, having connection with the body of the trailer 29.

In operation, a pair of these trucks is connected with the flooring of the trailer, and the adjacent ends of the trucks are connected by the cross chains 30, whereby movement of one truck is transmitted to the other truck of the trailer.

From the foregoing it is obvious that the trailer as constructed not only presents a structure especially adapted for summer use on rough ground, but at the same time presents a structure that may be efficiently used in winter, on snow or ice.

Having thus described the invention, what is claimed as new is:—

1. In a trailer, a pair of trucks, each of said trucks including side rails held in spaced relation with each other, the ends of said side rails extending upwardly at oblique angles, a pair of rails having their ends connected to the angular end sections of the side rails, rollers supported between the side rails, rollers supported between the ends of the upwardly inclined sections of the side rails, means for adjusting one of the rollers, and a creeper operating over the rollers.

2. In a trailer, side rails arranged in pairs, the ends of the side rails extending upwardly, a plurality of rollers supported by the side rails, rollers supported at the ends of the side rails, relatively large wheels supported between the side rails of each pair, said wheels having their lower portions operating in a plane with the lower portions of the rollers, said wheels having their upper portions operating in a plane with the upper portions of the rollers supported at the ends of the side rails, a creeper operating over the wheels and rollers, and means for adjusting one of the rollers to regulate the tension of the creeper.

In testimony that I claim the foregoing as my own, I have hereto affixed my signature in the presence of two witnesses.

LINCOLN G. COX.

Witnesses:
 HUBERT E. SAUNDERS,
 C. R. LEIGHTON.